US007813814B2

(12) United States Patent
Dittes

(10) Patent No.: US 7,813,814 B2
(45) Date of Patent: Oct. 12, 2010

(54) CONTROL SYSTEMS AND METHODS FOR VIRTUAL POWER PLANTS

(75) Inventor: Uwe Dittes, Ketsch (DE)

(73) Assignee: SAP AG, Walldorf (DE)

(*) Notice: Subject to any disclaimer, the term of this patent is extended or adjusted under 35 U.S.C. 154(b) by 287 days.

(21) Appl. No.: 11/529,739

(22) Filed: Sep. 29, 2006

(65) Prior Publication Data

US 2008/0188955 A1  Aug. 7, 2008

(51) Int. Cl.
  G05B 19/18 (2006.01)
  G05B 11/01 (2006.01)
  B29C 45/00 (2006.01)
  G05D 23/00 (2006.01)
  G06F 17/00 (2006.01)
  H04M 15/00 (2006.01)

(52) U.S. Cl. ............... 700/2; 700/19; 700/22; 700/200; 700/291; 705/37; 705/412

(58) Field of Classification Search ............ 700/2, 700/200, 291, 19; 705/412, 80, 37
See application file for complete search history.

(56) References Cited

U.S. PATENT DOCUMENTS

| 4,405,987 | A | * | 9/1983 | Spalti | 700/286 |
| 4,568,934 | A | * | 2/1986 | Allgood | 340/870.02 |
| 4,922,419 | A | | 5/1990 | Ohashi et al. | |
| 5,400,253 | A | | 3/1995 | O'Connor | |
| 5,451,755 | A | | 9/1995 | Duval et al. | |
| 5,924,892 | A | | 7/1999 | Ferracina | |
| 5,930,771 | A | | 7/1999 | Stapp | |
| 6,058,373 | A | | 5/2000 | Blinn et al. | |
| 6,088,363 | A | | 7/2000 | Shiobara | |
| 6,144,887 | A | * | 11/2000 | Kamiya et al. | 700/79 |
| 6,311,165 | B1 | | 10/2001 | Coutts et al. | |
| 6,389,375 | B1 | * | 5/2002 | Thomsen et al. | 703/2 |
| 6,507,851 | B1 | | 1/2003 | Fujiwara et al. | |
| 6,512,966 | B2 | * | 1/2003 | Lof et al. | 700/291 |
| 6,633,823 | B2 | * | 10/2003 | Bartone et al. | 702/57 |
| 6,640,278 | B1 | | 10/2003 | Nolan et al. | |
| 6,697,951 | B1 | * | 2/2004 | Sinha et al. | 713/300 |
| 6,763,999 | B2 | | 7/2004 | Coventry | |
| 6,785,592 | B1 | * | 8/2004 | Smith et al. | 700/291 |
| 6,850,820 | B2 | * | 2/2005 | Tajima | 700/286 |
| 6,904,385 | B1 | * | 6/2005 | Budike, Jr. | 702/182 |

(Continued)

FOREIGN PATENT DOCUMENTS

JP     2004-30343 A    1/2004

OTHER PUBLICATIONS

Virtual Power Station, http://de.wikipedia.org/wiki/Virtuelles_Kraftwerk (Mar. 18, 2006) (4 pages) (with translation).

(Continued)

Primary Examiner—Albert DeCady
Assistant Examiner—Thomas H Stevens
(74) Attorney, Agent, or Firm—Foley & Lardner LLP

(57) ABSTRACT

Systems and methods for the control of distributed systems are presented, particularly virtual power plants. Control software therefore communicates through an interface with decentralized devices. Modules are provided to formulate strategies based on predicted demand for the system, for controlling individual system devices, for system evaluation, for accounting purposes and to provide a user interface.

17 Claims, 10 Drawing Sheets

U.S. PATENT DOCUMENTS

| | | | |
|---|---|---|---|
| 6,910,017 B1 | 6/2005 | Woo et al. | |
| 6,963,854 B1 | 11/2005 | Boyd et al. | |
| 6,980,966 B1 | 12/2005 | Sobrado et al. | |
| 6,997,642 B2* | 2/2006 | Bishop, Jr. | 405/37 |
| 7,043,459 B2* | 5/2006 | Peevey | 705/412 |
| 7,072,843 B2 | 7/2006 | Menninger et al. | |
| 7,092,929 B1 | 8/2006 | Dvorak et al. | |
| 7,117,165 B1 | 10/2006 | Adams et al. | |
| 7,139,731 B1 | 11/2006 | Alvin | |
| 7,379,890 B2 | 5/2008 | Myr et al. | |
| 7,430,534 B2* | 9/2008 | Lof et al. | 705/37 |
| 7,634,449 B2* | 12/2009 | Alvarado et al. | 705/412 |
| 2002/0023500 A1 | 2/2002 | Chikuan et al. | |
| 2002/0026368 A1 | 2/2002 | Carter, III | |
| 2002/0078159 A1 | 6/2002 | Petrogiannis et al. | |
| 2002/0103745 A1* | 8/2002 | Lof et al. | 705/37 |
| 2002/0107713 A1 | 8/2002 | Hawkins | |
| 2002/0138176 A1 | 9/2002 | Davis et al. | |
| 2002/0147668 A1 | 10/2002 | Smith et al. | |
| 2002/0173990 A1 | 11/2002 | Marasco | |
| 2002/0184116 A1 | 12/2002 | Tam et al. | |
| 2003/0023500 A1 | 1/2003 | Boies et al. | |
| 2003/0028437 A1 | 2/2003 | Grant et al. | |
| 2003/0046195 A1 | 3/2003 | Mao | |
| 2003/0065646 A1 | 4/2003 | Joseph et al. | |
| 2003/0074250 A1 | 4/2003 | Burk | |
| 2003/0130883 A1 | 7/2003 | Schroeder et al. | |
| 2003/0144864 A1 | 7/2003 | Mazzrella | |
| 2003/0158791 A1 | 8/2003 | Gilberto et al. | |
| 2003/0172007 A1 | 9/2003 | Helmolt et al. | |
| 2003/0229502 A1 | 12/2003 | Woo | |
| 2003/0233307 A1 | 12/2003 | Salvadori et al. | |
| 2004/0015433 A1* | 1/2004 | Johnson et al. | 705/37 |
| 2004/0068443 A1 | 4/2004 | Hopson et al. | |
| 2004/0098358 A1 | 5/2004 | Roediger | |
| 2004/0102872 A1 | 5/2004 | Schick et al. | |
| 2004/0107141 A1 | 6/2004 | Conkel et al. | |
| 2004/0107180 A1 | 6/2004 | Yoshida | |
| 2004/0122766 A1 | 6/2004 | Brooks et al. | |
| 2004/0162763 A1 | 8/2004 | Hoskin et al. | |
| 2004/0186783 A1 | 9/2004 | Knight et al. | |
| 2004/0199441 A1 | 10/2004 | Mayfield | |
| 2004/0210542 A1 | 10/2004 | Sweeney | |
| 2004/0220861 A1 | 11/2004 | Morciniec et al. | |
| 2004/0267674 A1 | 12/2004 | Feng et al. | |
| 2005/0055283 A1 | 3/2005 | Zarovinsky | |
| 2005/0060270 A1 | 3/2005 | Ramakrishnan | |
| 2005/0086122 A1 | 4/2005 | Cirulli et al. | |
| 2005/0096947 A1 | 5/2005 | Fox et al. | |
| 2005/0096963 A1 | 5/2005 | Myr et al. | |
| 2005/0102192 A1 | 5/2005 | Gerrits et al. | |
| 2005/0102227 A1 | 5/2005 | Solonchev | |
| 2005/0165659 A1 | 7/2005 | Gruber | |
| 2005/0177442 A1 | 8/2005 | Sullivan et al. | |
| 2005/0197887 A1 | 9/2005 | Zuerl et al. | |
| 2005/0209906 A1 | 9/2005 | Bayoumi et al. | |
| 2006/0036507 A1 | 2/2006 | Pujar et al. | |
| 2006/0112099 A1 | 5/2006 | Musgrove et al. | |
| 2006/0149653 A1 | 7/2006 | Davis et al. | |
| 2006/0178986 A1 | 8/2006 | Giordano et al. | |
| 2006/0259376 A1 | 11/2006 | Ferreri et al. | |
| 2007/0239373 A1* | 10/2007 | Nasle | 702/58 |
| 2007/0271185 A1 | 11/2007 | Engler et al. | |

OTHER PUBLICATIONS

Verivox, http://www.verivox.de/News/ArticleDetails.asp?aid=10141 (Mar. 18, 2006) (4 pages) (with translation).

Rheinland-Pfalz, "Virtuelles Kraftwerk—Intelligente Energie für Klima- und Ressourcenschutz", Secretary of State of Margit Conrad, Stefanie center two emperor Friedrich road 1.55116 Mainz, pp. 1-5 (Jun. 6, 2005) (with translation) (2 pgs.).

Siemens AG—PoF 1/02 Artike121 Energieversorgung Irtuelle Kraftwerke (www.siemens.com) (Mar. 18, 2006).

News Service Science, "A virtual power station in the resin for . . . a virtual power station in the resin for the power supply from tomorrow", Yokes Brikmann Technical University of Clausthal, pp. 1-2 (Sep. 8, 2004) (http://www.idw-online.de/pages/de/news85375 (Mar. 18, 2006).

U.S. Appl. No. 60/374,892, filed Apr. 22, 2002, Krajec.

"Beyond Markdown Management", summer/autumn 03, the 4caster, Issue 4, vol. 2, 4 pages.

"Retailers Manage Markdown Challenges Using i2 Solutions", Jan. 13, 2003, NRF 92nd Annual Convention & Expo, 2 pages.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Subrahmanyan et al., "Developing optimal pricing and inventory policies for retailers who face uncertain demand", Journal of Retailing, vol. 72, No. 1, Spring, 1996, 15 pages.

Office Action for U.S. Appl. No. 10/863,816, mailed Apr. 1, 2009, 11 pages.

Office Action for U.S. Appl. No. 10/863,816, mailed Dec. 1, 2009, 8 pages.

Office Action for U.S. Appl. No. 10/863,816, mailed Nov. 13, 2008, 8 pages.

Office Action for U.S. Appl. No. 10/927,645, mailed Apr. 1, 2009, 36 pages.

Office Action for U.S. Appl. No. 10/927,645, mailed Feb. 23, 2010, 30 pages.

Office Action for U.S. Appl. No. 10/927,645, mailed Oct. 15, 2008, 20 pages.

Office Action for U.S. Appl. No. 10/927,645, mailed Sep. 2, 2009, 33 pages.

Office Action for U.S. Appl. No. 11/028,491, mailed Dec. 22, 2009, 16 pages.

Office Action for U.S. Appl. No. 11/028,491, mailed Dec. 9, 2008, 16 pages.

Office Action for U.S. Appl. No. 11/028,491, mailed Jun. 22, 2009, 17 pages.

Office Action for U.S. Appl. No. 11/028,491, mailed May 27, 2008, 12 pages.

Office Action for U.S. Appl. No. 11/590,192, mailed Nov. 27, 2009, 10 pages.

Office Action for U.S. Appl. No. 11/646,824, mailed Mar. 31, 2010, 16 pages.

Office Action for U.S. Appl. No. 11/646,824, mailed Sep. 16, 2009, 19 pages.

\* cited by examiner

CONTROL SYSTEMS AND METHODS FOR VIRTUAL POWER PLANTS

BACKGROUND OF THE INVENTION

The present invention relates generally to the field of virtual power plants, but may be broadly applied to distributed systems of devices, or systems that generate a collective quantity through diverse generators to meet a certain demand. Embodiments of the invention relate specifically to methods and systems for controlling and managing virtual power plants.

Virtual power plants produce power with high efficiency and are thus likely to be an important energy source in the future. A virtual power plant generator network comprises a collection of small, decentralized power generating units. These might be, for example, windmills, photovoltaic generators, heat exchangers, fuel cells or fossil fuel generators. These generating units are principally located on private, residential properties or public buildings, but can also be present in industrial or agricultural installations, e.g. by using the heat generated by production processes.

The decentralized power generating units may be linked together over a communications network and controlled using software.

SUMMARY OF THE INVENTION

A first embodiment relates to a distributed system control unit, comprising at least one communications interface; the at least one communications interface coupled at least indirectly to two modules; wherein a first of the two modules comprises executable code for controlling at least two geographically distributed devices; and wherein a second of the two modules comprises executable code for developing a strategy to control the at least two geographically distributed devices.

A second embodiment relates to a method for controlling a plurality of geographically distributed devices, comprising the steps of: receiving data comprising active status and output of at least one device through a communications interface; calculating a system state; calculating, based on the system state and historical data a predicted demand; and controlling through the communications interface the at least one device corresponding to the predicted demand.

A further embodiment relates to a machine readable medium having computer code embedded therein which, when executed causes the machine to perform a method comprising the steps of: receiving data from a plurality of power generating devices, the data indicating an active state and, if active, an output of each device; receiving historical data from a database; calculating a predicted power demand; and controlling each of the plurality of devices to change a system state if the predicted demand is different than a present system state.

DETAILED DESCRIPTION OF THE PREFERRED EMBODIMENTS

While the following description will primarily relate to virtual power plants, embodiments of the present invention are envisioned as being useful in a number of applications involving the control of devices spread over a wide geographical area, but used for a common purpose.

Figure 1:
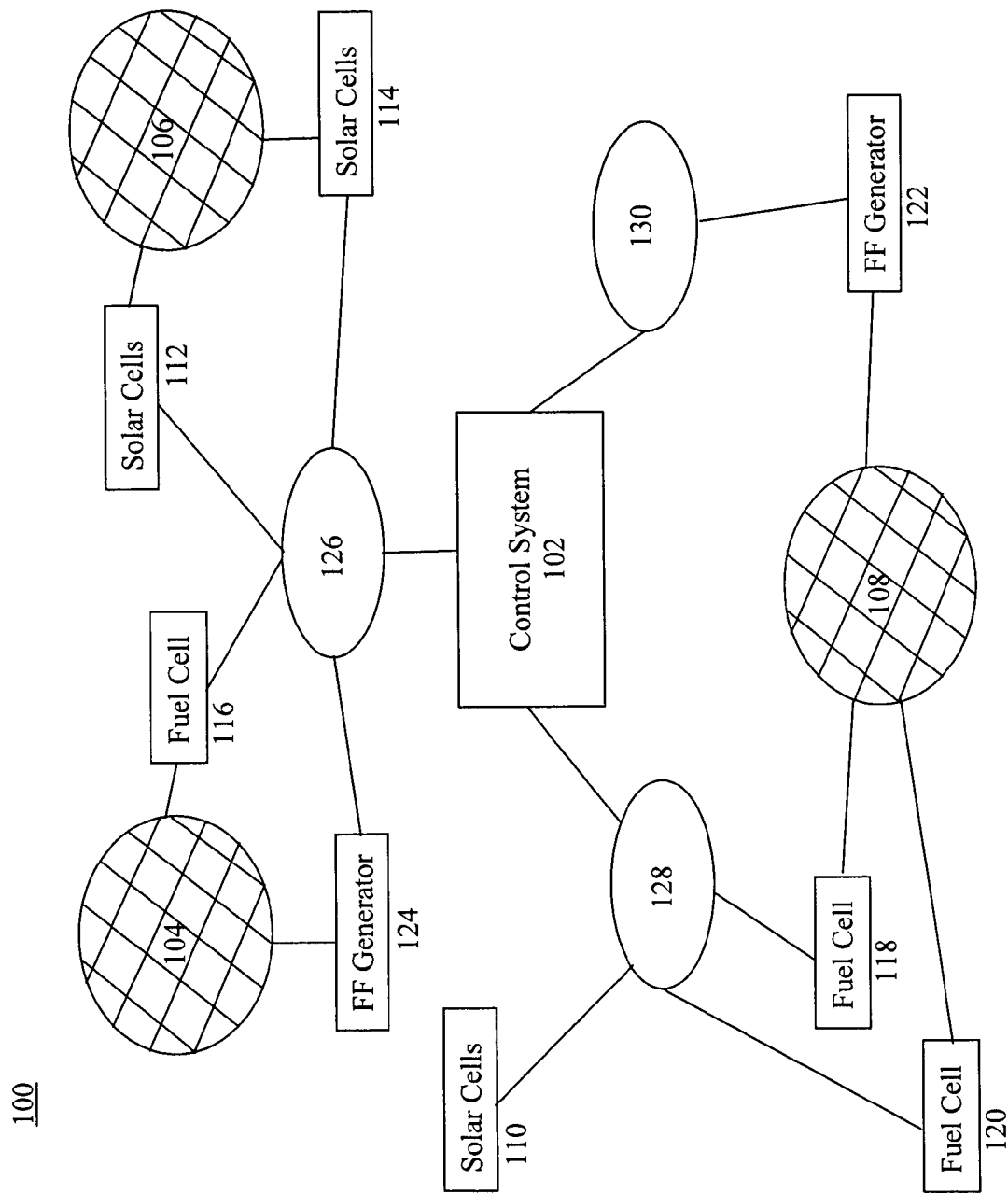
FIG. 1 is a diagram showing a representative virtual power plant.

A representative virtual power plant 100 is shown in FIG. 1. The virtual power plant 100 has a control unit 102, utility grid sections 104, 106 and 108, solar power generating units 110, 112 and 114, fuel cell generators 116, 118 and 120, and fossil fuel generators 122 and 124. It should be understood that the choice of generating units is merely for the sake of example. The generators 110 through 124 are generally geographically distributed. Also shown are communications networks 126, 128 and 130.

Each geographically distinct generating unit 110 through 124 is connected to a utility grid connection point. This allows the generating units to produce power that can be supplied to the grid to which it is connected. Each power generator 110 through 124 also has an isolation circuit (not shown) that allows the generator to be decoupled and isolated from the grid should it be desirable to take the generator offline. It should be noted that utility grid sections 104, 106 and 108 may be part of the same grid, which can be a public or private network.

Each geographically distinct generating unit 110 through 124 is also equipped with a communications interface (not shown) that allows it to communicate with control system 102 through one of networks 126, 128 or 130. Communication may be had over any readily available link, including public IP networks, but is preferably performed over a private, encrypted network for system security. The generators 110 through 124 may be redundantly coupled to multiple networks to control system 102.

Control system 102 uses communication networks 126, 128, and 130, which may be the same network, to control the operation of the virtual power plant 100. Each of the power generators 110 through 124 reports information regarding its current status, for example, the current power level it is producing for the network, its current maintenance status, available fuel supply, if applicable, local loads, etc. The control system 102 accepts and processes incoming information about generators 110 through 124 and makes predictions about future energy demand, and makes corresponding changes to the generating status of power generators 110 through 124 based on the predicted demand.

Figure 2:
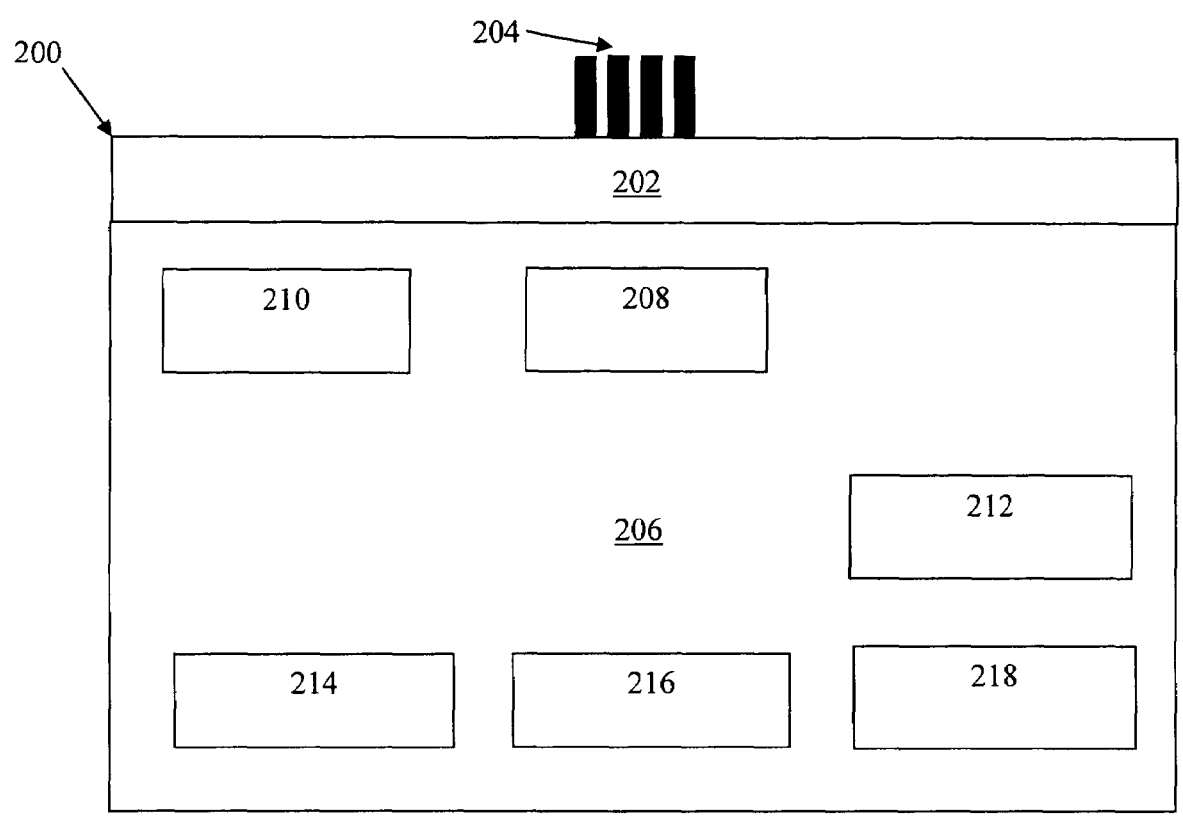
FIG. 2 is a block diagram depicting elements of an exemplary control system for a virtual power plant.

One embodiment of a control system may be seen in reference to FIG. 2, which is a block diagram of a control system for a virtual power plant, such as the power plant 100 shown in FIG. 1. Control system 200 should be understood as software such as that employed by SAP AG, running on a hardware platform suitable for the computational task. Control system 200 has a communications interface 202, communications connections 204, and control software 206, which further comprises modules 208, 210, 212, 214 and 216. Control software 206 further comprises a data storage and retrieval mechanism 218.

The control software 206 is able to control virtual power plants and to assist in the solution of tasks that occur in the management of such virtual power plants. In order to accomplish this, the control program is constructed of highly integrated, modular components 208 through 216. These components comprise the functionality for planning a power generation strategy, evaluating the current state of the power plant, controlling individual power generation, accounting for power generation and the attendant costs, revenues and bookkeeping, as well as the provision of an control system operator interface. The control software 206 may include further modules as needed for the management of tasks as they arise during the course of virtual power plant operation.

Figure 3:
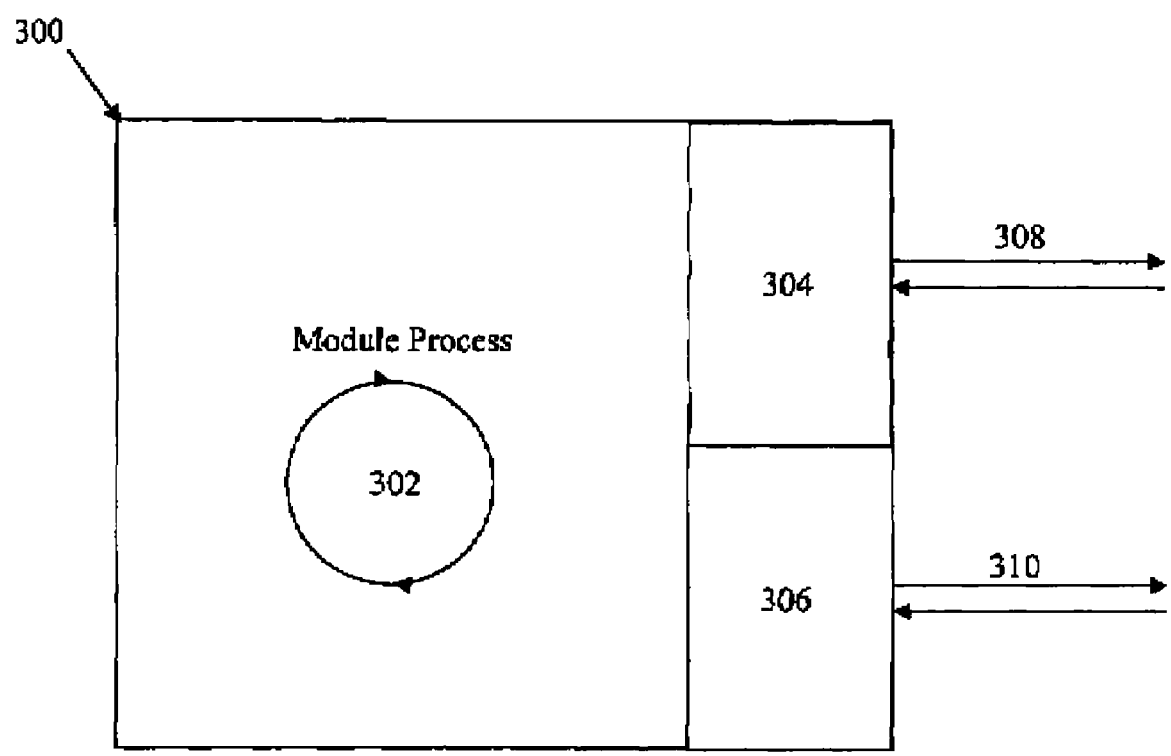
FIG. 3 is a block diagram of modules exhibiting standard interface communications.

In a preferred embodiment, modules forming parts of the control software 206 SAP are constructed in a highly integrated and modular fashion. An exemplary module 300 is shown in FIG. 3. Here, the term "module" should be understood to mean a collection of code to perform one or more particular functions. Module 300 comprises a module process, which will be understood by a person of ordinary skill in the art to be a set of procedures and data that carry out the purpose of the module.

Module 300 also comprises interfaces 304 and 306. It should be understood that module 300 may have a variety of interfaces depending on the needs of the system. Interfaces 304 and 306 are preferably Application Programming Interfaces (APIs) that allow the passage of data in a standardized way, where standardized means that the interface that the interface has components that do not change through different versions of the control software. The interfaces 304 and 306 are used by module 300 and at least one other module (not shown) to exchange data through communication pathways 308 and 310. A suitable interface is any interface that allows a second module to communicate with module 300 without the second module having direct access to the data space of module 300 in the module process 302.

Preferably, the interfaces also provide an encapsulation that allows the corresponding modules to communicate over suitable standardized interfaces with programs and applications from third party providers. The Modules can also be integrated into programs and applications from third parties. The reverse is also true: more technically oriented programs from third party providers can be integrated into the control software over suitable standardized interfaces. The control software is thus capable of providing the functionality of the central control program of a virtual power plant.

Figure 4:
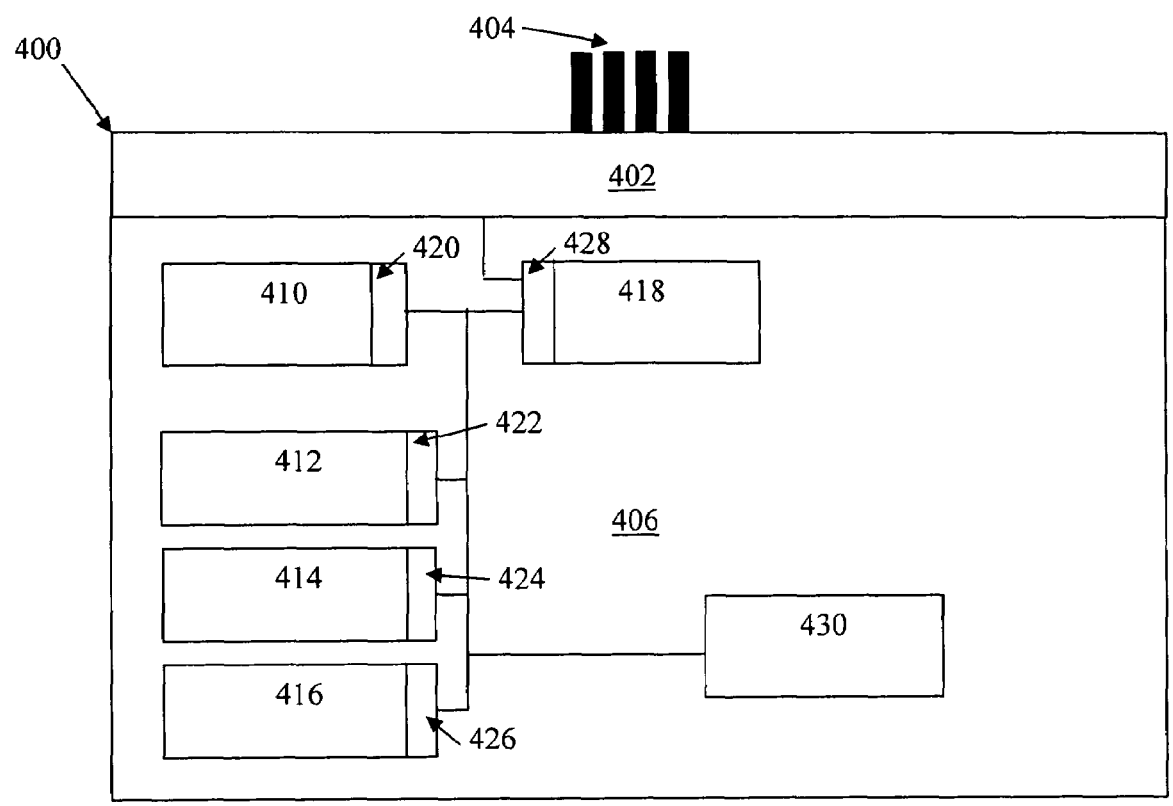
FIG. 4 shows the integrations of modules into a control system for a virtual power plant.

The modularity is illustrated in FIG. 4, wherein a control system is described in reference to a specific embodiment. Control system 400 has a communications interface 402 and communications connections 404, similar to the control system shown in FIG. 2. Control system 400 also has control software 406, which comprises a generator control module 418, a planning module 410, an accounting module 412, an evaluation module 414 and a control system user interface module 416. Each module 410 through 418 also has at least one corresponding interface 420, 422, 424, 426, and 428, through which the modules communicate with one another. Generator control module 418 is further in communication with individual, decentralized generators through communications interface 402. Generator control module 418, in this embodiment, can thus provide state information relating to the decentralized power generators to other modules as needed, and can control the decentralized modules by sending signals to the decentralized power generators that comprise control signals or command information.

Control system 400 also comprises an information storage subsystem 430 such as those known in the art, which is responsible for keeping track of the system state, historical data, accounting data, and various information used to perform calculations in each of the modules. Subsystem 430 may comprise a number of databases and corresponding interfaces or managers that allow access to information from the various system modules.

Figure 5:
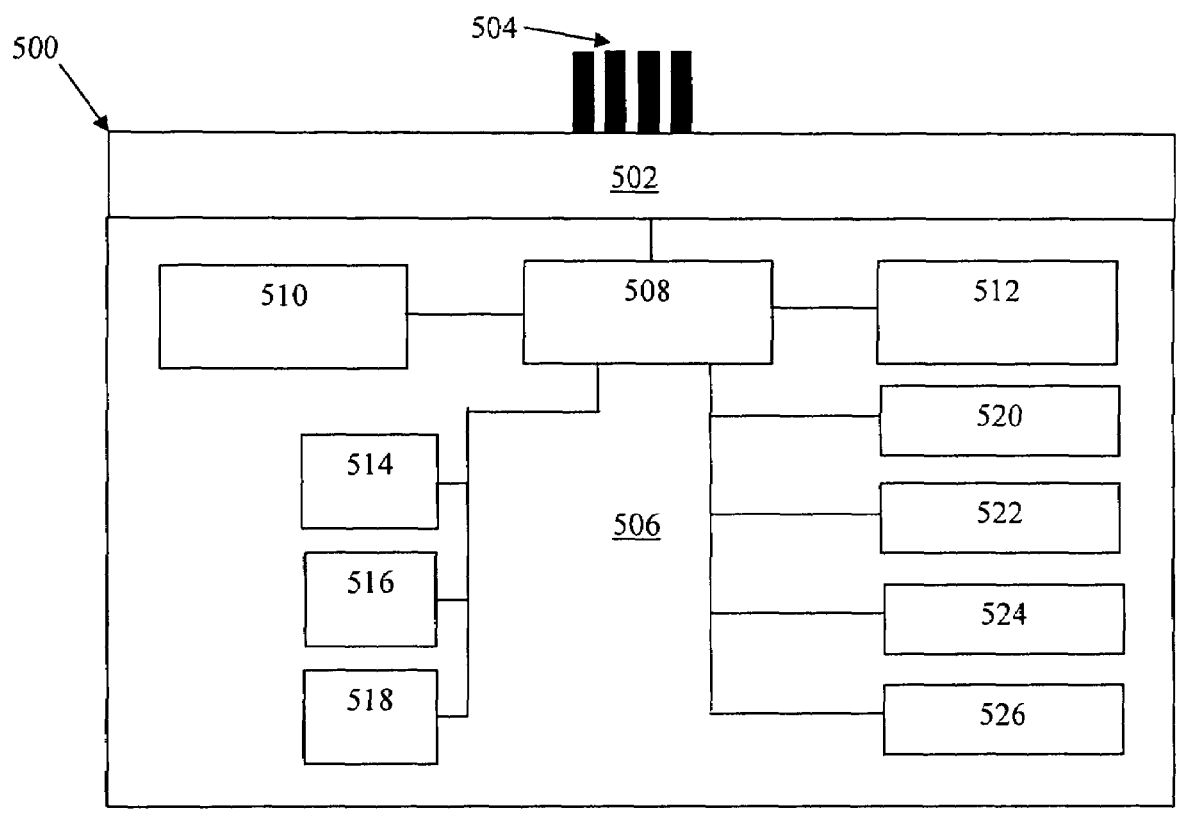
FIG. 5 shows the organization of one embodiment of a control system for a virtual power plant.

A further embodiment of the control system is depicted in FIG. 5. FIG. 5 shows a control system 500 having a communications interface 502, communications connections 504, and a control software 506. Control system 500 also comprises a module 508 for integration of other system modules; a module 510 for planning of the expected energy demand; a module 512 for communication of the individual power generators with the central control and for control of the individual energy producers in real time; interface modules 514, 516 and 518 for interfacing with third party modules and systems; a module 520 for the calculation of the costs/contributions of power for the individual power generators (accounting); a module 522 for performing system evaluation and computation of the system state; and a module 524 for the visualization (via a user interface) of planning, control and accounting data. Subsystem 526 is responsible for data storage and management, much as subsystem 430 in FIG. 4.

Module 508 acts as a data switch to communications interface 502 and provides other modules with interfacing for intermodule communications. Of course, it should be noted that the arrangement of FIG. 4 may also be used, or some combination of the two. That is, some modules may be in direct communication with each other or communications interface 502 through their own integrated interfaces, while other modules may communicate through systems integration module 508. Module 508 also performs housekeeping activities such as records storage and maintenance by means of subsystem 526.

Modules 514, 516 and 518 provide standardized interface functionality for third party or additional modules that may be used depending on user preferences. For example, it may be necessary or advisable to generate reports specific to a third party user format, or it may be necessary or advisable to communicate with a third party database or foreign system. Interface modules 514, 516 and 518 provide flexibility through standardized interfaces for performing integration to foreign systems.

Modules 510 and 512, in combination with module 522 provide the computational engine of the control aspects of the system. It should be noted that these modules may be integrated into a single module, but that advantages can be achieved when divided. This is particularly true in the case of virtual power plant systems, where a wide variety of systems comprising decentralized power generators may need to be integrated and controlled in the system. It is therefore also to be seen that advantages can be obtained by further modularity. This can mean, for example, dividing control module 512 into a number of submodules, each specific to a particular generator type (including manufacturer, model number, communications interface, etc.). Modules 510, 512 and 522 provide a number of services for managing virtual power plants, including automatic reaction to disturbances and failure of decentralized power generators (intelligent and independent compensation).

Figure 6:
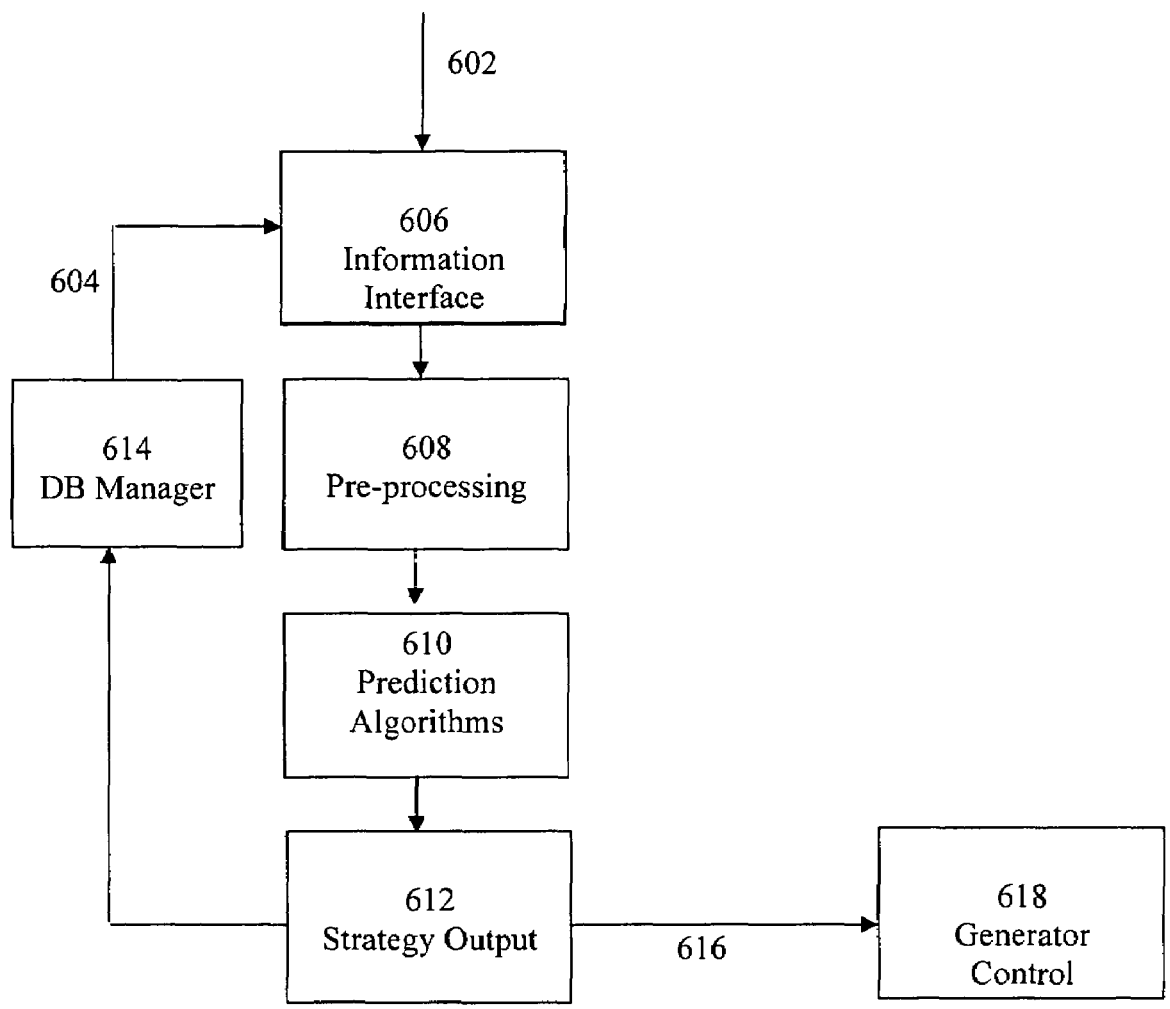
FIG. 6 is a flow diagram describing the function of an Energy Demand module.

A data flow chart for an exemplary planning module is explained herein with reference to FIG. 6. Information (status, current power, load, etc.) from the individual, decentralized power generators connected to the network is delivered (602) to the information interface 606 of the exemplary planning module. This information may be delivered from any relevant pathway but is preferably delivered from a system evaluation module over a corresponding interface.

The planning module also has access to stored historical information, which can be provided, for example, by database manager 614 to information interface 606. It should be understood that any conventional storage scheme may be used. Information provided by database manager 618 may relate to previous states of the system, including load, energy demand and individual generator status/performance information. It may also including historical load/demand information correlated to the time, as well as other pertinent information (such as current weather conditions). The information is preprocessed at 608 and passed to intelligent prediction algorithms 610, which are responsible for future energy demand as well as updating prior predictions with more current data. In addition, the information is passed to a strategy output 612 which transmits information to database manager 614. Database manager 614 transmits data 604 to information interface 606.

The planning module thereupon generates strategies that guide the covering of short, mid and long-term energy demand. Strategies take into account a number of factors, including the availability of individual, decentralized power generators, cost/power functions known or estimated for individual power generators, the availability of stored energy and its cost, the projected load and demand volatility, as well as economic factors such as incentives that may be affected through use of particular generators. The Planning module attempts to develop a strategy that will optimize cost performance while still maintaining high reliability. The results of the strategy are fed back for storage to database manager 614 and output (616) to generator control module 618 over an appropriate interface.

Figure 7:
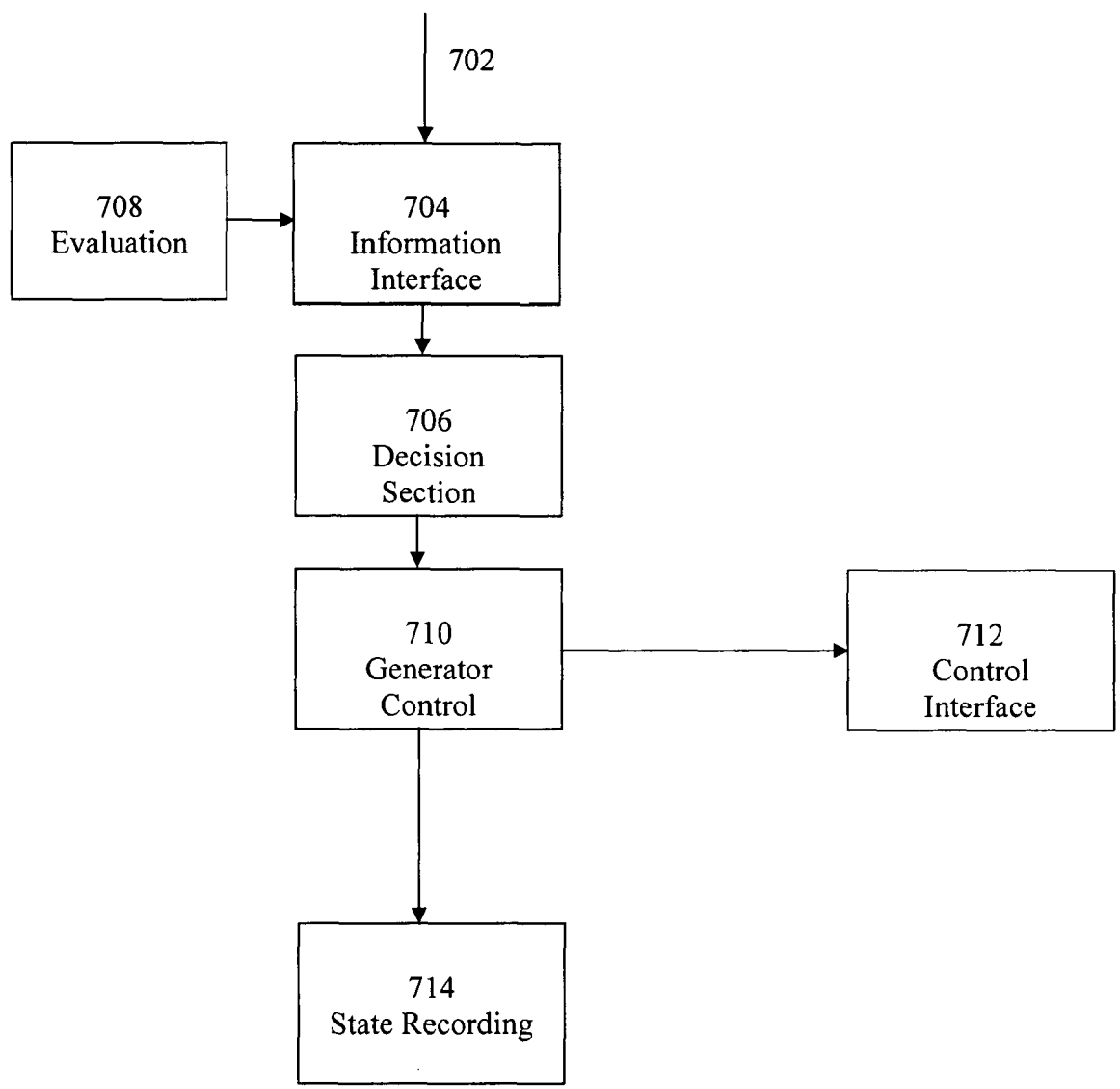
FIG. 7 is a flow diagram describing the function of a Control of Power Generators module.

An exemplary generator control module is now delineated in greater detail in reference to FIG. 7. The generator control module receives data (702) from the planning module through a corresponding interface. This information is communicated to decision section 706, which may also use information from a system evaluation module 708. Decision section 706 implements the strategies of the planning section by controlling individual, decentralized power generators through the control interface 712 via a generator control 710. Information about control decisions made is output to other system elements 714 responsible for keeping track of the system state.

The control module has several options for control. According to the circumstances, generators can be taken on or offline, or their output redirected to storage if available. If an active decentralized power generator suddenly goes offline, the generator control module has several possibilities to compensate for the gap in production: increasing the energy production of online decentralized power generators; taking addition power generators online or switching energy storage units online. Moreover, based on a comparison between planned data and actual data, additional activities can be carried out, if for example the power of a generator lies outside of its specific range, which can indicate a problem. Here the generator control module can cause the execution of diagnostic and repair programs or send messages and reports to the repair team.

Figure 8:
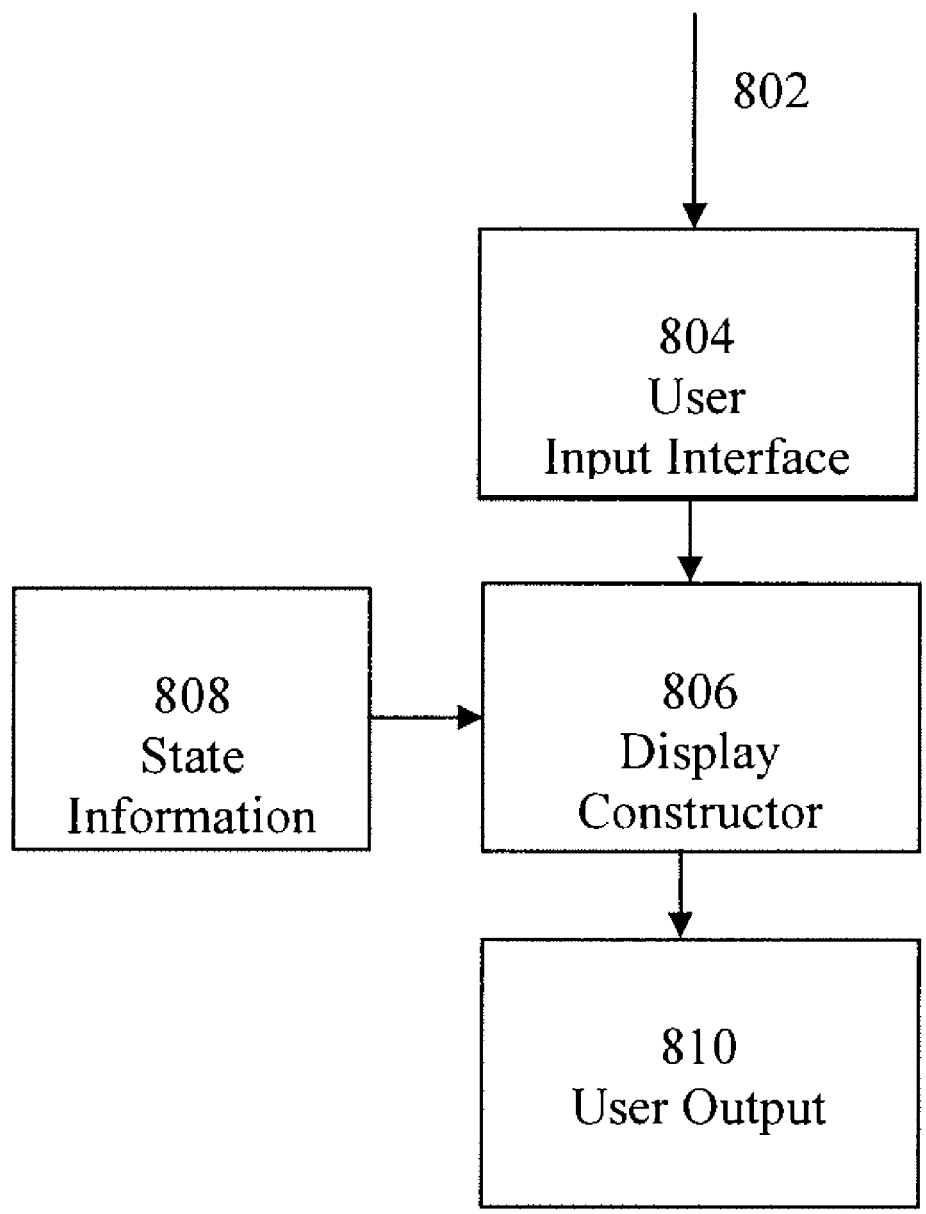
FIG. 8 is a flow diagram describing the function of a Graphical Display module.

An exemplary control system user interface is described with reference to FIG. 8. The control system user interface module receives input (802) from the user through a user input interface 804. Input interface 804 may be in communication with a display constructor 806. Display constructor 806 may be in communication with a user output 810. This information allows the module to understand how the user wishes to configure control system user interface output. Information about the current system state and predicted state data is also communicated (808) to the module.

The display constructor 810 has the capability to display data from the control system as well as data from integrated programs and applications from third parties in a form suitable for users over output 812. The display format is evaluated interactively dependent on the application context. For example, the overview of periodic data concerning planned and actual power generation can be prepared and displayed as a table. The detailed data for a decentralized power generator, such as for example the power level, can be visualized as power curves. The overview of status (active, inactive, out of order, etc.) of the decentralized power generators of a virtual power plant are displayed with suitable picture elements (LEDs, stoplights, etc.) All indicators generated by the display constructor are automatically updated when the underlying data changes through the input of state information 808. The user has the opportunity to change the graphical display according to suit his or her needs.

Figure 9:
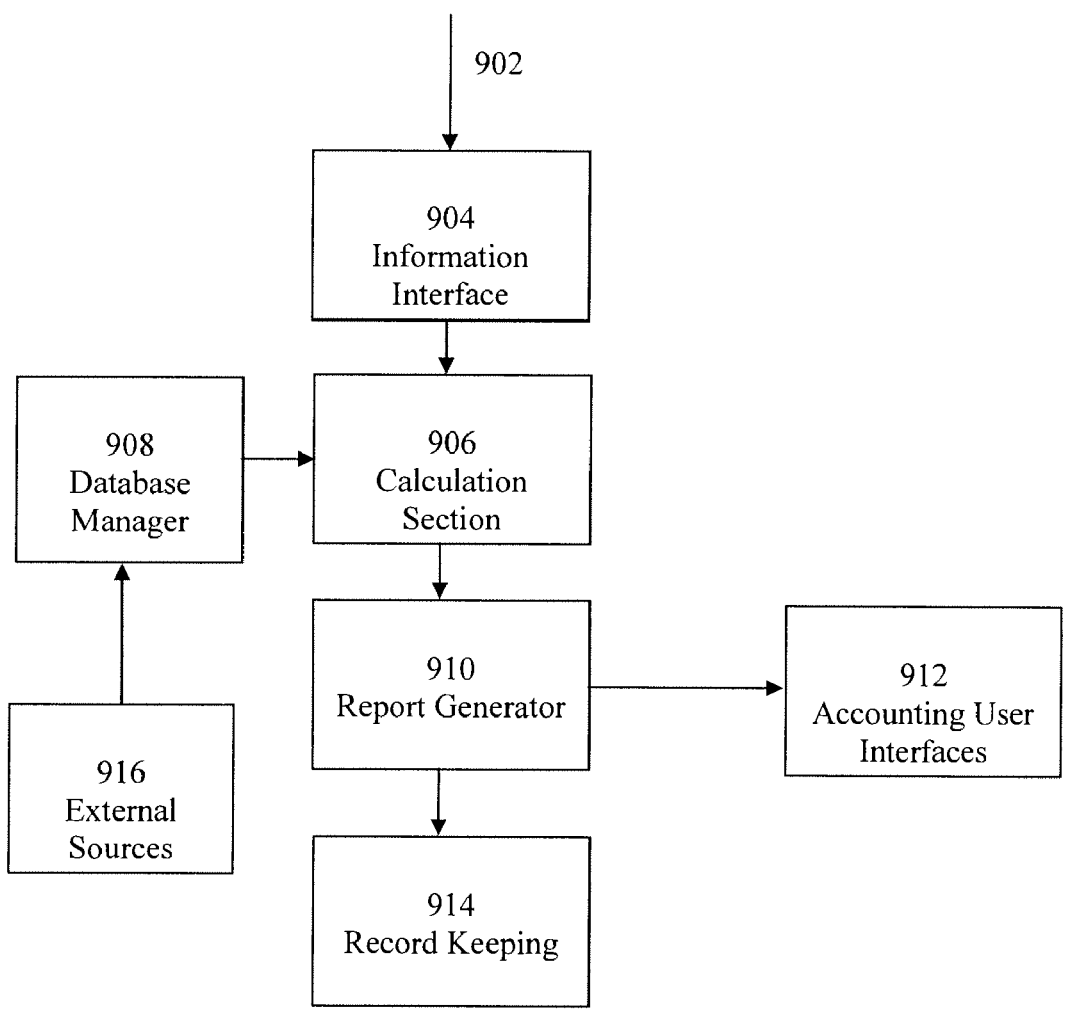
FIG. 9 is a flow diagram describing the function of an Accounting module.

An exemplary accounting module is described herein with reference to FIG. 9. The accounting module receives information about past states (902) through an information interface 904, as well as stored information necessary to perform financial calculations, such as tariff plans and information that may be supplied by third parties, such as current rate structures. This information is used by a calculation section 906 to generate reportable data in calculation section 906, which is past to report generator 910. Report generator 910 generates, based on the data for the decentralized power plants, corresponding reports. The reporting flow over electronic communication with the accounting entities 912 of the power plant operators and operators of decentralized power generators is supported as is the printing of reports on paper. Through an exchange of data with authorities, the focused and automatic implementation of tax-based withholding or incentive programs can be carried out. Accounting data is also passed to record-keeping 914 for proper archival of the information. In an exemplary embodiment, a database manager 908 may be in communication with an external source 916 and calculation section 906.

Figure 10:
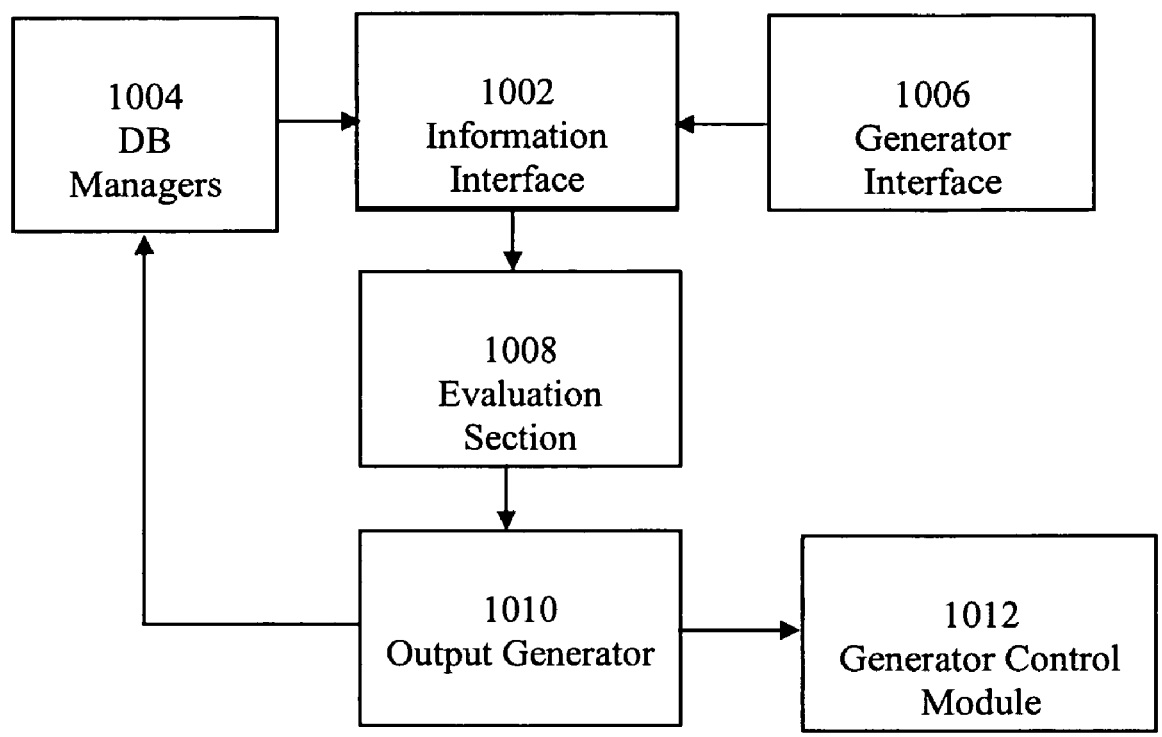
FIG. 10 is a flow diagram describing the function of an Evaluation module.

An evaluation module is explained with reference to FIG. 10. The evaluation module comprises analytical and calculation programs to aide the investigation and evaluation of current data from the virtual power plant network. It receives over an appropriate information interface 1002 both stored information from a database manager 1004 or other suitable storage system as well as information about current device state through a generator interface 1006. Evaluation section 1008 computes a standardized set of system state data and may check this data against criterion indicative of system health provided by database manager 1004. Evaluation section 1008 may be in communication with an output generator 1010. Output Generator 1010 may be in communication with a generator control module 1012. Together with the rest of the control system modules, this allows simplified maintenance of the virtual power plant as well as proactivity (on the basis of predicted data).

While the invention has been described with reference to various embodiments, it will be understood by the person of ordinary skill in the art that such embodiments are exemplary of the invention, and do not define it in a restrictive manner.

What is claimed is:

1. A distributed generation system, comprising:

a first power generation unit, the first power generation unit comprising a first control interface, the first control interface configured to control a power generation of the first power generation unit, the first power generation unit being a structure able to generate power;

a second power generation unit, the second power generation unit comprising a second control interface, the second control interface configure to control a power generation of the second power generation unit, the second power generation unit being another structure able to generate power;

a central controller comprising a strategy module and a control module, the central controller is configured to communicate a first control command to the first control interface and to communicate a second control command to the second control interface; and the strategy module is configure to determine a first power output of the first power generation unit and a second power output of the second power generation unit based on a tariff structure, a first unit capacity, a second unit capacity, a first unit availability and a second unit availability, the first power output of the first power generation unit being a first targeted power production level of the first power generation unit and the second power output of the second power generation unit being a second targeted power production level of the second power generation unit, the first unit availability being based on whether the first power generation unit may be utilized to produce power and the second unit availability being based on whether the second power generation unit may be utilized to produce power;

wherein the first control command is based on the first power output of the first power generation unit;

wherein the second control command is based on the second power output of the second power generation unit.

2. The distributed generation system of claim 1, wherein the strategy module is further configured to determine the first power output of the first power generation unit and the second power output of the second power generation unit based on a first cost of the first power generation unit and a second cost of the second power generation unit.

3. The distributed generation system of claim 1, wherein the strategy module is further configured to determine the first power output of the first power generation unit and the second power output of the second power generation unit based on a projected load and a demand volatility.

4. The distributed generation system of claim 1, further comprising a third module, comprising executable code for evaluating a current state of each of the first power generation unit and the second power generation unit.

5. The distributed generation system of claim 1, wherein the strategy module is further configured to determine the first power output of the first power generation unit and the second power output of the second power generation unit based on a projected load and a demand volatility and wherein the projected load and the demand volatility are based on a weather condition.

6. The distributed generation system of claim 1, wherein the strategy module is further configured to determine the first power output of the first power generation unit and the second power output of the second power generation unit based on a first power generation unit performance and a second power generation unit performance.

7. The distributed generation system of claim 1, further comprising a fourth module, comprising executable code for accepting system state data and generating thereupon a report of costs and revenue.

8. The distributed generation system of claim 1, wherein the strategy module is further configured to determine the first power output of the first power generation unit and the second power output of the second power generation unit based on a first cost of the first power generation unit, a second cost of the second power generation unit, a projected load, a demand volatility a first power generation unit performance, and a second power generation unit performance.

9. The distributed generation system of claim 8, further comprising a third module, comprising executable code for evaluating a current state of each of the first power generation unit and the second power generation unit.

10. The distributed generation system of claim 9, further comprising a fourth module, comprising executable code for accepting system state data and generating thereupon a report of costs and revenue.

11. The distributed generation system of claim 1, wherein a fifth module comprises executable code for receiving data relating to a cost performance function of at least one of the first power generation unit and the second power generation unit.

12. A method for controlling a plurality of geographically distributed devices, comprising the steps of:

receiving a first status of a first power generation unit and a first output of the first power generation unit, the first power generation unit being a structure able to generate power, a first power output of the first power generation unit being a first targeted power production level of the first power generation unit;

receiving a second status of a second power generation unit and a second output of the second power generation unit, the second power generation unit being another structure able to generate power, a second power output of the second power generation unit being a second targeted power production level of the second power generation unit;

calculating a system state based on the first status, the second status, the first output and the second output;

calculating, based on the system state and historical data, a predicted demand;

determining a third output of the first power generation unit based on a tariff structure, a first unit capacity, and a second unit capacity;

determining a fourth output of the second power generation unit based on the tariff structure, the first unit capacity, and the second unit capacity;

controlling through a communications interface at least one of the first power generation unit and the second power generation unit based on at least one of the third output and the fourth output; and storing data relating to the first output, the second output, the third output, and the fourth output.

13. The method of claim 12, wherein the third output of the first power generation unit is further based on a first cost of the first power generation unit.

14. The method of claim 12, further comprising calculating based on cost to performance data a strategy based on the predicted demand.

15. The method of claim 14, wherein the strategy comprises data indicating a future active status of the first power generation unit and the second power generation unit.

16. The method of claim 12, further comprising the step of generating a report based on the system state.

17. The method of claim 12, wherein the step of controlling through the communications interface the at least one of the first power generation unit and the second power generation unit based on the at least one of the third output and the fourth output comprises controlling the first power generation unit and the second power generation unit through an interface specific to the first power generation unit and the second power generation unit.

* * * * *